Oct. 9, 1928.
G. M. NELL
VALVE FOR ROCK DRILLS
Filed Sept. 24, 1923
1,687,381
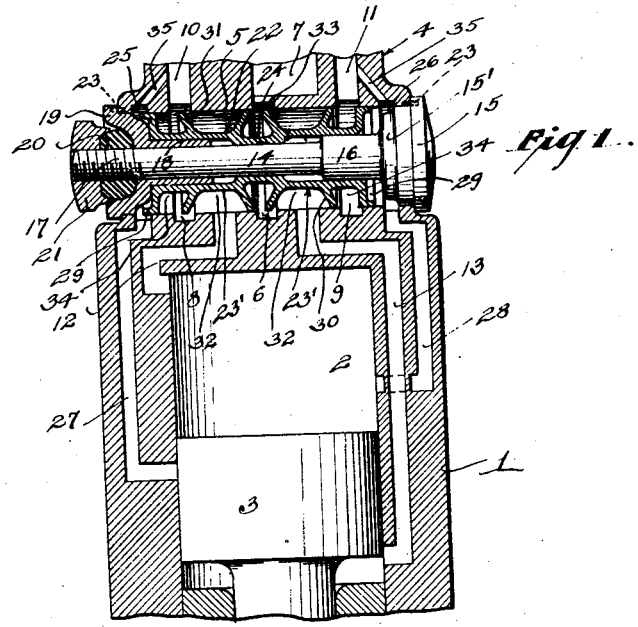
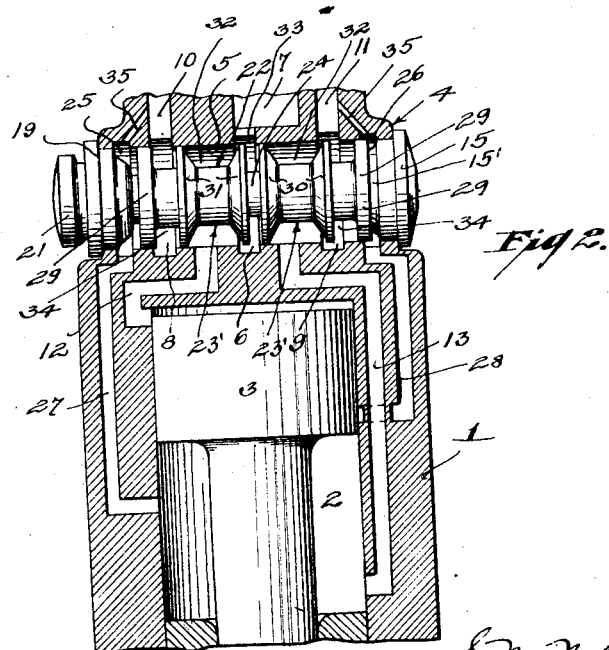
Inventor
G. M. Nell
By
Attorney Patented Oct. 9, 1928.

1,687,381

UNITED STATES PATENT OFFICE.

GUSTAVE M. NELL, OF CLEVELAND, OHIO, ASSIGNOR TO THE CLEVELAND ROCK DRILL COMPANY, OF CLEVELAND, OHIO.

VALVE FOR ROCK DRILLS.

Application filed September 24, 1923. Serial No. 664,488.

The present invention is directed to improvements in fluid distributing valves for rock drills or the like.

The invention has for its primary object to provide a valve of this nature so constructed that the port areas are increased without increasing the diameter of the valve chest, whereby the valve chest will be comparatively light.

A further object of the invention is to provide a valve of this character which is extremely compact and light so as to gain high speed in operation.

With these and other objects in view this invention resides in the novel features of construction, formation, combination and arrangement of parts to be hereinafter more fully described, claimed and illustrated in the accompanying drawing, in which:—

Figure 1 is a somewhat sectional diagrammatic view showing the piston in its forward or striking position and the valve in a position to effect the rearward movement of the piston.

Figure 2 is a similar view showing the valve in its position to distribute the fluid to move the piston in a reverse direction.

Referring to the present embodiment of the invention 1 designates the cylinder which has reciprocally mounted in its chamber 2 the piston 3. The cylinder has associated therewith a transversely disposed valve chest 4 having a longitudinal bore 5 in which is formed a centrally located annular groove 6 which is in communication with the live air supply port 7, and upon opposite sides of said groove are annular grooves 8 and 9 and from which lead exhaust ports 10 and 11, respectively. Leading from the front and rear ends of the chamber 2 are combined fluid distributing and exhaust permitting passages 12 and 13, which open into the bore 5 between the central groove 6 and grooves 8 and 9.

Extending axially through the bore 5 is a valve guide rod 14, one end thereof having a head 15 which closes the adjacent end of the bore, said head being provided with an annular portion 15' and a reduced extension 16. The opposite end of the rod 14 is threaded as at 17 and extends beyond the chest 4. Removably engaged with the rod is an annular extension 18 having a terminal cup-shaped head 19, there being a rubber gasket 20 engaged on the threaded end of the rod and located in the cavity of the head 19, a nut 21 being threaded upon said rod and engaged with the gasket and serving to hold the rod against longitudinal movement. The gasket also serves to absorb shocks incident to the valve 22 striking the heads 15 and 19. To prevent rotation of the heads 15 and 19 dowel pins 23 are employed.

The valve 22 comprises a pair of opposed sleeves 23' integrally connected by a collar 24, which is restricted for slidably engaging the rod 14, the internal diameters of the sleeves 23' being such as to be annularly spaced from the rod 14 and capable of snugly and slidably receiving the respective extensions 16 and 18, as clearly shown in Fig. 1 of the drawing.

The head 19 and annular portion 15' are surrounded by annular chambers 25 and 26, respectively. Passageways 27 and 28 connect respectively intermediate portions of the chamber 2 with the chambers 25 and 26, and since these chambers open into the chamber 2 they will be alternately covered and uncovered as the piston 3 reciprocates in the chamber 2, which action permits motive fluid from the chamber 2 to alternately enter the end chambers 25 and 26 and act upon the end flanges 29 of the valve 22. In addition to the end flanges 29, each sleeve 23' of the valve is provided with a pair of spaced annular webs 30 and 31, the webs of each pair being divergingly arranged to provide annular fluid admitting and exhaust grooves 32, there being an annular groove 33 formed by and between the central webs 30 and 31 which is in constant communication with live air port 7.

The end flanges 29 form in conjunction with the adjacent webs 30, annular grooves 34 to permit the exhaust motive fluid, which passes from the ends of the chamber 2, through the passages 12 and 13 to alternately pass through the exhaust ports 10 to atmosphere, the passages 12 and 13 permitting fluid under pressure to alternately enter the opposite ends of the chamber 2 to reciprocate the piston 3. Connecting the chambers 25 and 26 with the exhaust ports 10 are ducts 35, and since the cross sectional area thereof is less than that of the ports 10 sufficient pressure will be built up in the respective chambers 25 and 26 to shift the valve before passing through the ports 10 and to atmosphere. It will be observed that the webs 30 will prevent live air from passing from the grooves 8 and 9 to the exhaust ports 10, as will the webs 31 prevent live air from entering the respective passages 12 and 13, when serving as exhaust ports.

When the valve is in the position as shown in Fig. 1 of the drawing, fluid under pressure will pass from the port 7 and enter the groove 33 and from thence into the passage 13 and into the front end of the chamber 2, and will drive the piston 3 rearwardly, the exhaust fluid having passed through the passage 12, groove 32 and exhaust port 10 upon the left hand side of the valve. As the piston moves rearwardly a small amount of fluid compressed in the chamber rearwardly of the piston will pass through the passageway 28 into the chamber 26 owing to the fact that the adjacent duct 35 is relatively small. When a slight pressure is built up in said chamber it will act upon the flange 29 and hold the valve momentarily in the position as shown in Fig. 1. This fluid "bleeds" to atmosphere through the associated duct 35 and relieves the pressure in the chamber 26. As soon as the piston uncovers the passageway 27, upon its rearward movement, motive fluid will pass from the chamber 2 thereinto and enter the chamber 25, thereby moving the valve to the right to the position as shown in Fig. 2 of the drawing, whereupon live air will enter the rear end of the chamber 2, through the passage 12 and drive the piston forwardly, a small amount of air under compression having entered the passageway 27 enters the chamber 25 and holds the valve momentarily until the fluid "bleeds" to atmosphere through the associated duct 35.

It will be observed that live air from the port 7 will at all times be in the groove 33 and ready for distribution to the respective passages 12 and 13, and the grooves 32 will be alternately brought into communication therewith for distributing and exhausting the fluid from the ends of the piston chamber 2.

What is claimed is:—

1. The combination with a cylinder, of a piston mounted therein, a valve chest for the cylinder, a rod fixed axially in the chest, said chest being connected with the cylinder through distributing and exhaust ports, a valve in the chest for slidably engaging the rod and controlling the distribution of fluid to and from the cylinder, said valve including a collar and end sleeves, said sleeves being each provided with a plurality of diverging webs defining annular end grooves and a central groove for controlling the distribution of fluid to and from the cylinder through the distributing and exhaust ports, said valve also having end flanges, said chest having pressure chambers at each end, and means controlled by the piston for admitting fluid under pressure alternately to the pressure chambers and against the flanges, and means for exhausting fluid from said chambers.

2. The combination with a cylinder, of a piston mounted for reciprocation therein, a valve chest, fluid distributing and exhaust ports connecting the ends of the cylinder with the valve chest, said chest having heads in its ends and surrounded by pressure chambers, a rod connecting the heads, a valve including a central collar for slidably engaging the rod, and end sleeves, said sleeves being each provided with a pair of spaced annular webs the innermost webs defining therebetween a central groove and co-operating with the outer webs to define end grooves, the central groove being constantly in communication with a source of live air from the chest to maintain a constant supply of pressure fluid therein, said end grooves being adapted to control the distribution and exhaust of motive fluid to and from the cylinder through the fluid distributing and exhaust ports, flanges carried by the ends of the sleeves and movable in the pressure chambers, and means controlled by the piston for admitting fluid under pressure to the pressure chambers against said flanges to effect the reciprocation of the valve.

In testimony whereof I have hereunto set my hand.

GUSTAVE M. NELL.